United States Patent [19]

Lee

[11] Patent Number: 5,554,968
[45] Date of Patent: Sep. 10, 1996

[54] DATA COMMUNICATION USING POWER LINES

[76] Inventor: Raymond Lee, 51 Old Ox Rd., Manhasset, N.Y. 11030

[21] Appl. No.: 293,845

[22] Filed: Aug. 22, 1994

[51] Int. Cl.⁶ ............................................. H04M 11/04
[52] U.S. Cl. ........................ 340/310.01; 340/310.08; 340/825.06
[58] Field of Search .................. 340/310.01, 310.02, 340/310.08, 825.06

[56] References Cited

U.S. PATENT DOCUMENTS

| | | | |
|---|---|---|---|
| 2,032,360 | 3/1936 | Green | 340/310.05 |
| 2,264,395 | 12/1941 | Mitchell | 370/71 |
| 2,264,396 | 12/1941 | Moore | 379/66 |
| 3,689,886 | 9/1972 | Durkee | 340/310.08 |
| 3,810,096 | 5/1974 | Kabat et al. | 340/310.08 |
| 4,162,486 | 7/1979 | Wyler | 340/310.08 |
| 4,410,883 | 10/1983 | Swiston, Sr. | 340/310.01 |
| 4,524,288 | 6/1985 | Schimmelpennink et al. | 340/310.01 |
| 4,556,864 | 12/1985 | Roy | 340/340.08 |
| 4,638,298 | 1/1987 | Spiro | 340/310.01 |
| 4,703,706 | 10/1987 | Barritt | 340/310.08 |
| 4,899,129 | 2/1990 | MacFadyen et al. | 340/310.08 |
| 5,051,720 | 9/1991 | Kittirutsunetorn | 340/310.08 |

Primary Examiner—John K. Peng
Assistant Examiner—Edward Lefkowitz
Attorney, Agent, or Firm—Michael I. Kroll

[57] ABSTRACT

The apparatus uses electric power lines to send and receive command, control, and data signal structures. Message signals are superimposed upon the AC power signals present on existing power lines. Transmit and receive sets are equipped with a unique individual coding (for identification and security) to complete the communication links. When a message signal is sent onto the line the unique code of the sending unit is placed at a predetermined position in the transmitted signal, such as in the header. Also the intended receiving unit code is placed in the message signal. In this manner, an individual receiving network at a given location will be activated only when its unique code has been placed into a message on the line sent by another unit. This coding ensures that only the intended location receiver will be able to "trap" the signal. The signals sent will be mid to high frequency and will be composed of low level logic/digital bits.

5 Claims, 1 Drawing Sheet

DATA COMMUNICATION USING POWER LINES

BACKGROUND OF THE INVENTION

1. Field of the Invention

The present invention relates to data communication via power lines. More specifically, it relates to a system of sending signals down the existing power lines to operate such devices as remote controls for VCR's, personal computers, security systems, and the like. The possible uses for this invention are endless and it is therefore hard to pinpoint exactly what fields of human endeavor stand to benefit most from the invention. Certainly the field of medicine stands to reap substantial benefits because of the increased possibilities of transmission of digitized computer medical information. Remote areas, served by electrical power lines but not having telephone lines, may now access all sorts of digital information resources previously unavailable. Marketing and service information for all sorts of products will gain an instant increase in the number of potential buyers by the use of this invention.

Thus it can be seen that the potential fields of use for this invention are myriad, and the particular preferred embodiment described herein is in no way meant to be limiting the particular field chosen for exposition of the details of the invention.

2. Description of the Prior Art

In the past, it has been attempted to provide telephone communications to rural areas, not served by telephone lines. Power lines that were widely installed with the assistance of the Rural Electrification Administration of the United States government were commonly used. These known devices, although they were broadly means for providing communication over a power line grid, were strictly analog in nature. They were not particularly successful because of the inherent limitations of the analog bandwidth and their focus on the transmission of voice signals only. The main drawback was that only one call could be handled at a time.

Eventually, nearly all households and businesses in this country became wired with telephone circuitry. Over the years the introduction of digital computers and the corresponding introduction of digital communications took advantage of the nearly universal telephone hookups in this country. Almost all the equipment designed for digital communication was designed to use the existing telephone lines. The lowly electrical power line was forgotten as to its potential for carrying information communication as well as power.

As the world moves to a more global economy, there now exist many third world countries with electric power lines but having sparse, or none at all, telephone wiring. The need therefore exists, much as in the early rural United States, for a device providing communications ability to the common electrical power line. Today, however, "communications ability" means much more than the early voice communication envisioned by the early patents. It means control of the operation of all sorts of electrical appliances as well as the transmission, reception, and storage of vast amounts of textual and graphical information. To my knowledge, there has not, until now, been an attempt to apply sophisticated communications technology to an existing electrical power line grid. As will be seen, the simplicity and effectiveness of my invention is not rivaled in the prior art.

The following pertinent prior art was discovered in a search conducted at the United States Patent and Trademark Office:

U.S. Pat. No. 5,051,720, issued to Kittirutsunetorn on Sep. 24, 1991, shows a remote control system using the power line of a remote site. This patent indicates many of the communications abilities envisioned by the instant invention. The patented system of controlling power at a remote site includes a two channel modem having a first channel dedicated for transmitting power controlling messages to power control modules and a second channel dedicated to transmitting data messages to computerized equipment. The power control modules include a master control module which is plugged into a power line extending through the remote site and one or more slave modules also coupled to the remote site power line for receiving therethrough power control signals transmitted by the master control unit. A user, located at a site distant from the remote site, may turn power on, off, or dim the power to any of a plurality of appliances which are coupled to the remote power line by way of slave power control units.

Insofar as the patent shows control of several sorts of equipment through an existing household power line, U.S. Pat. No. 5,051,720 is hereby incorporated by reference into the instant disclosure. The patent teaches how one may control computers, printers, alarm systems, telephone answering machines, lighting, video recorders, magnetic tape recording machines and other remote appliances simply by plugging them in to a power line circuit at a given site. The patent does not use the existing power line or power line grid between the local and remote site to transmit the control signals.

By contrast, the device of the instant invention uses the main electrical power lines for transmission of the control signals to the various controlled equipment. There is no need to use a conventional telephone line for the operation of this invention. The instant invention proposes transmitting coded signals over a line similar to the telephone line used by the above patent and others. However, a major difference is that the transmission is not dependent on the existence of any telephone line or any other sort of link such as radio or microwave.

U.S. Pat. No. 2,264,395, issued to Mitchell on Dec. 2, 1941, shows a power line carrier frequency telephone system. The patent shows a line for transmitting electric power, for example, of relatively high voltage and low frequency between two or more points and to a plurality of power consumers, some or all of whom, together with others in the locality through which the line extends, desire telephone service. Telephone subscribers stations are coupled to the power line and are adapted to receive and transmit telephone signals on high frequency or carrier waves. At each station and at the central office for the system, means are provided for modulating the carrier waves for transmission outgoing from the station or office, and for demodulating a modulated carrier wave incoming to the station or office. A single source of carrier wave, common to the system, is located at the central office, or at one of the stations, or may be coupled to the power line at some point along the line outside of a station or the central office. Because the distances between stations and between a station and the central office may be appreciable and will vary with the stations involved in a particular call, there may be phase differences between the carrier wave at the called or calling station and that of the calling or called station. That is to say, there may be phase differences in transmission occurring between the carrier wave employed for modulation and the carrier wave employed for demodulation. Any adverse effect, i.e., loss in demodulation output at the receiving station, that might follow from such a condition may be precluded by arranging the stations and the central office to transmit and receive only the carrier wave and one side-band of the modulated carrier wave. When a pair of stations are using the telephone capabilities of the patented system, other users are essentially blocked from access to prevent potential interference. To the extent that the patent teaches transmission of analog signals by superposition of high frequency carrier waves upon normal power lines, U.S. Pat. No. 2,264,395 is hereby incorporated by reference.

By contrast, the device of the instant invention is intended to transmit coded digital signals over existing electric power lines. The above mentioned problems of phase difference and potential interference are circumvented. By using existing high speed digital packet transfer technology and unique coding for individual users it is anticipated the instant invention will be accessible to many simultaneous users on the same electrical power grid.

U.S. Pat. No. 2,264,396, issued to Moore on Dec. 2, 1941, shows a device similar to that discussed above with respect to the patent to Mitchell. A different modulator-demodulator circuit is shown in the patent to Moore. When a pair of stations are using the telephone capabilities of the patented system, other users are essentially blocked from access to prevent potential interference. To the extent that the patent teaches transmission of analog signals by superposition of high frequency carrier waves upon normal power lines, U.S. Pat. No. 2,264,396 is hereby incorporated by reference.

By contrast, the device of the instant invention is intended to transmit coded digital signals over existing electric power lines. The above mentioned problems of phase difference and potential interference are circumvented. By using existing high speed digital packet transfer technology and unique coding for individual users it is anticipated the instant invention will be accessible to many simultaneous users on the same electrical power grid.

U.S. Pat. No. 2,032,360, issued to Green on Mar. 3, 1936, shows a power line carrier system. The patented device shows the use of current transformers allowing impedance matching of the overall network. To the extent that the patent teaches transmission of analog signals by superposition of high frequency carrier waves upon normal power lines, U.S. Pat. No. 2,032,360 is hereby incorporated by reference.

By contrast, the device of the instant invention is intended to transmit coded digital signals over existing electric power lines. The above mentioned problems of phase difference and potential interference are circumvented. By using existing high speed digital packet transfer technology and unique coding for individual users it is anticipated the instant invention will be accessible to many simultaneous users on the same electrical power grid.

It will be noted that all the prior art devices require either a telephone line for the transmission of digital signals or abandon digital signals entirely in favor of frequency modulated signals if they use an electrical power line.

None of the above inventions and patents, taken either singly or in combination, is seen to describe the instant invention as claimed.

SUMMARY OF THE INVENTION

Briefly, the invention conceives the use of electric power lines to send and receive command, control, and data signal structures. The transmit and receive sets are equipped with a unique individual coding (for identification and security) to complete the communication links. When a message signal is sent onto the line the unique code of the sending unit is placed at a predetermined position in the transmitted signal, such as in the header. Also the intended receiving unit code is placed in the message signal. In this manner, an individual receiving network at a given location will be activated only when its unique code has been placed into a message on the line sent by another unit. This coding ensures that only the intended location receiver will be able to "trap" the signal. The signals sent will be mid to high frequency and will be composed of low level logic/digital bits.

Accordingly, it is a principal object of the invention to provide a new and improved data communication system using electric power lines which overcomes the disadvantages of the prior art in a simple but effective manner.

It is a major object of this invention to provide an improved communication system which does not rely in any way on telephone wiring or telephone switching networks for its operation.

It is another object of the invention to provide an improved communication system which will comply with all Federal Communications Commission regulations concerning radiated emissions.

It is another object of the invention to provide an improved communication system which will operate at a high enough frequency so as not interfere in any way with the primary function of electric power lines of conducting electric power for use by subscribers in the operation of electric appliances.

It is another object of the invention to provide an improved communication system which will operate at a low enough frequency so that efficient propagation of communication signals down power transmission lines can be achieved.

It is another object of the invention to provide an improved communication system which will operate at close to zero phase angle so as not to interfere with or affect the electric utility load criterion.

It is another object of the invention to provide an improved communication system which will have an effective range of at least 60 miles which range can be effectively increased with repeaters if desired.

It is another object of the invention to provide an improved communication system which makes-available an entire range of communication possibilities to any structure by the use of simple plug in devices without the necessity of any further connections.

It is another object of the invention to provide an improved communication system which will not require the generation of any radio frequency signals to further clog the already crowded airwaves.

It is another object of the invention to provide an improved communication system which is truly portable and always available.

It is another object of the invention to provide an improved communication system which will require only one receiver network/center per receiving structure.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

Various other objects, features, and attendant advantages of the present invention will become more fully appreciated as the same becomes better understood when considered in conjunction with the accompanying drawing, in which like reference characters designate the same or similar parts throughout the view, and wherein:

The FIGURE is a schematic diagram of the overall system of the invention.

DETAILED DESCRIPTION OF THE PREFERRED EMBODIMENT

Figure 1:
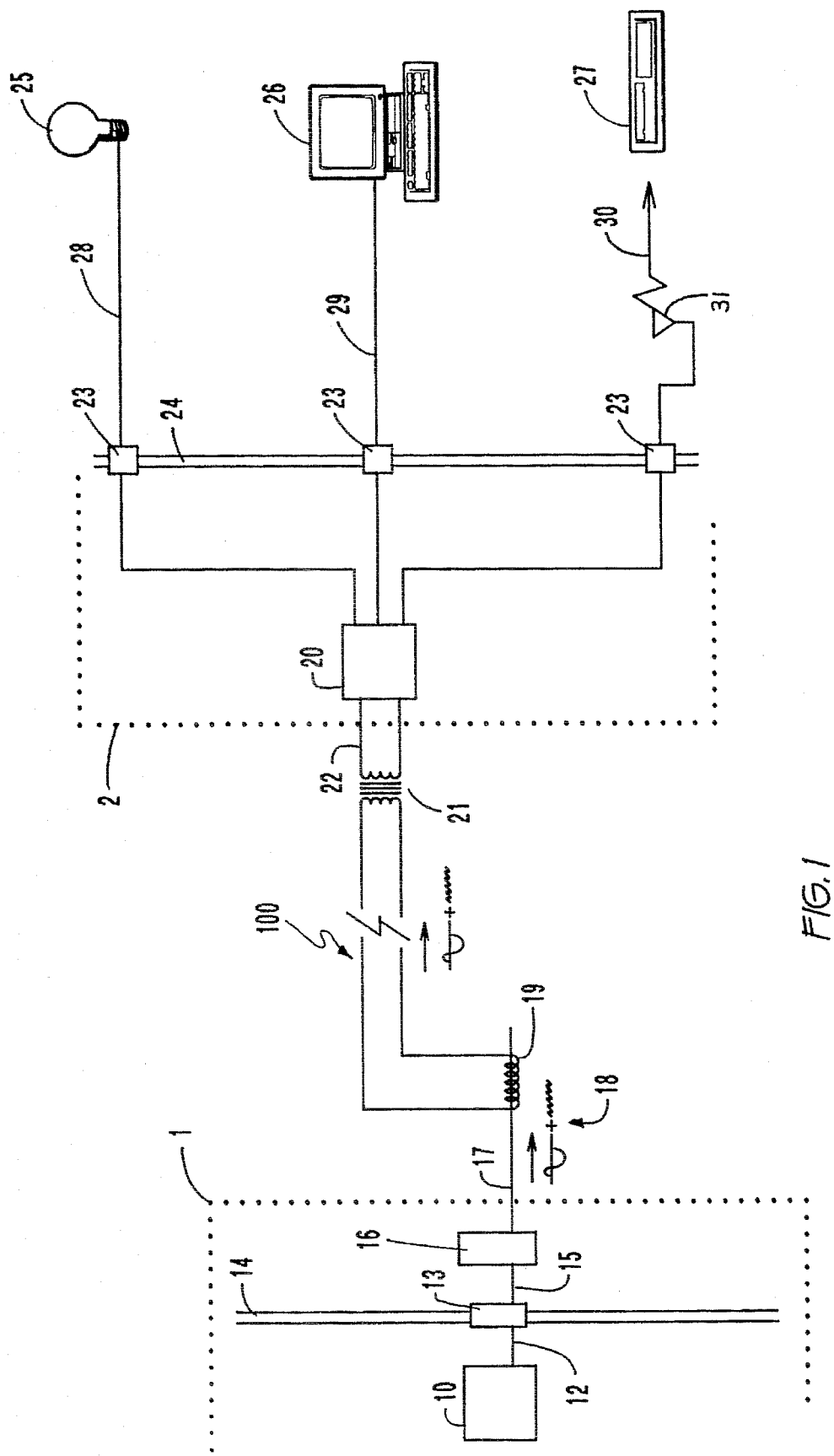

As shown in the drawing the present invention consists of a means of communication between a structure 1 and a remote structure 2 connected to one another only by an electric power transmission line 100. A transmitter/controller device 10, located at structure 1, is plugged into an outlet 13 in a wall 14 by means of a wire 12. Wire 15 further connects outlet 13 to the main structure AC power input box 16. Main power line 17 leading from structure 1 leads to an existing local transformer 19. Shown at 18 is a schematic representation of the signal in line 17. It demonstrates that the signal is made up of a main AC power signal of low frequency (typically 60 Hz.) plus a superimposed high frequency, pulsing, or "ripple" signal which has been transmitted by transmitter 10. The transformer 19 is connected to the standard power transmission lines 100.

On the other end of the power transmission lines 30, near structure 2, is an existing power line transformer 21, such as is normally used to step down the transmission line voltage from a high transmission potential to the commonly used 120 volt household potential. It should be noted that these transformers on both ends of the power transmission line will do nothing to the superimposed "ripple" data signal of this invention except perhaps introduce a slight phase lag into the signal. The phase lag will have no effect on the operation of the equipment contemplated as using the communication signal to be more fully described later.

A "smart" receiver 20 is located in structure 2. The receiver is "smart" in that it is programmed only to capture ripple signals on the incoming power line that have been encoded with a unique destination code which matches that of the receiver. All other ripple signals on incoming power line 22 will be blocked from transmission into structure 22 or otherwise rendered ineffective. In this manner signals being sent to another structure on the power line grid (not shown) cannot enter structure 2 and have no possibility of interfering in any way with the operation of any electrical appliances within structure 2. However, if a packet of information identified as belonging to structure 2 is detected, the receiver will pass through that particular ripple to all the standard electrical wiring outlets 23 in walls 24 of structure 2. From this point onward the actual control of appliances, such as 25, 26, and 27 within structure 2, in accordance with the digital control signals derived from the ripple signal, is easy to accomplish. For examples of such control the reader is referred to the incorporated U.S. Pat. No. 5,051,720. For ease in making the comparison it is pointed out that "smart" receiver 20 of this invention corresponds roughly to master unit X10 of the incorporated patent. The major difference between the smart receiver 20 and master unit X10 would be the addition of conventional pulse blocking or blunting circuitry which remains active until a specific user code is detected. This type of circuit is commonly in use today in remote pager units and further description is not believed to be required.

The various controlled appliance units 25, 26, and 27 of this invention correspond to the combined slave units and appliances of the incorporated patent. It is contemplated that the slave decoding units could either be incorporated into the wall plug outlets of structure 2, incorporated into the appliances themselves, or incorporated into the power cords 28 connecting appliances 25 and 26 or the power cord 29 connecting the appliance 27. Regardless of their location the slave units would operate to control their respective appliances in a manner such as disclosed in the incorporated patent.

At least three kinds of control signals are contemplated by the instant invention and the drawing shows a single example of a possible use for each. The simplest is an on off control signal that might be used to turn on a light appliance 25 through line 28. Another type of signal could be a full fledged data string of text or graphics information which is represented by wire 29 to computer 26. Finally, a command control code could be received such as illustrated by signal 30 controlling VCR 27 via standard VCR remote controller 31. The artisan will recognize that the possible combinations of these three types of data transmission, via electric power lines, are endless.

It is to be understood that the invention has been described, for simplicity only, with reference to structure 1 being the transmitting structure while structure 2 is the receiving structure. In actuality, both structures would contain combined transmit/receive units to make possible two-way communication between any two structures on the electric power grid.

A list of reference numerals for the present invention follows:

1 first structure
2 second structure
10 encoding transmit unit
12 wire from transmit unit to wall outlet
13 wall outlet in first structure
14 wall in first structure
15 wire from wall to AC junction box
16 AC junction box
17 wire from junction box to transformer
18 schematic of signal in wire 17
19 main power transformer
20 "smart" receiver
21 main power transformer
22 line from transformer to receiver
23 wall outlets in structure 2
24 wall in structure 2
25 controlled light appliance
26 controlled computer appliance
27 controlled video recorder appliance
28 on-off control line to light
29 data control line to computer
30 command control signal to VCR
31 VCR remote controller
100 standard power transmission lines It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily ascertain that a unique digital pulse code is not the only means by which an individual receiver could be activated. For example, tones of certain frequency in a certain sequence similar to touch tone telephones could be used. For security, a "ready" acknowledgment verification at the receiving unit might be required before the transmitting unit actually delivers the message unto the line. All current technological advances, such as increased bandwidth and error free communication protocols, are to be considered within the realm of this invention where applicable. A variety of other devices that could be controlled in this manner would also be obvious to the routinist. Some examples are facsimile machines, telephone answering machines, and programmable digital computers capable of controlling further appliances.

It is to be understood that the present invention is not limited to the sole embodiment described above, but encompasses any and all embodiments within the scope of the following claims:

I claim:

1. A data communication system using existing power transmission lines comprising:

transmitting means at a first site for superimposing on the power transmission lines connected to and providing power to said first site a superimposed ripple signal including a unique identifying portion containing a site destination code;

a second site connected by said power transmission lines, said second site containing a plurality of diverse electrical devices with local wiring connected to and operated by the electrical power delivered by said transmission lines;

receiver means at said second site interposed between said transmission lines and said local wiring for passing said electrical power from said transmitting lines to said local wiring, said receiver means being responsive to said site destination code for passing said superimposed ripple signal containing said site destination code through to said local wiring and all of said electrical devices in said second site when said unique identifying portion is present and for blocking any ripple signal when said unique site destination code is absent to avoid any interference by said ripple signal with the operation of any electrical device in said second site; and control means operatively coupled to said local wiring in said second site so as to control electrical devices that are plugged into said wiring, in accordance with said superimposed signal passed through by said receiver means.

2. The data communication system of claim 1, wherein;

said superimposed signal further includes an encoded portion capable of causing said control means to turn on and off the power to one of said appliances.

3. The data communication system of claim 2, wherein;

said superimposed signal further includes an encoded portion capable of causing said control means to further transmit command control sequences to cause remote operation of one of said appliances.

4. The data communication system of claim 3, wherein;

said superimposed signal further includes an encoded portion capable of causing said control means to further transmit and store data on one of said appliances.

5. The data communication system of claim 1, wherein;

one of said appliances is a programmable digital computer and said superimposed signal is capable of initiating a program stored in said computer, wherein said program is capable of causing said computer to send its own secondary control signals to other appliances so as to further control the operation of said other appliances.

* * * * *